United States Patent

[11] 3,602,328

[72] Inventors Chester N. Fannin
Troy;
Carlos P. Afanador, Centerville, both of, Ohio
[21] Appl. No. 871,476
[22] Filed Oct. 21, 1969
[45] Patented Aug. 31, 1971
[73] Assignee The Dayton Steel Foundry Company
Dayton, Ohio
Continuation-in-part of application Ser. No. 770,196, Oct. 24, 1968, now abandoned.

[54] CALIPER TYPE DISC BRAKE WITH REMARKABLE FRICTION PADS
2 Claims, 6 Drawing Figs.

[52] U.S. Cl. .................................................. 188/72.5,
188/73.6
[51] Int. Cl. .............................................. F16d 55/228
[50] Field of Search ........................................ 188/72.5,
73.2, 73.6

[56] References Cited
UNITED STATES PATENTS

| | | | |
|---|---|---|---|
| 2,754,936 | 7/1956 | Butler | 188/73.6 X |
| 2,784,811 | 3/1957 | Butler | 188/73.4 |
| 2,989,149 | 6/1961 | Klaue | 188/73.2 X |
| 3,053,346 | 9/1962 | Butler | 188/72.6 |
| 3,384,203 | 5/1968 | Walther et al. | 188/71.1 |
| 3,310,135 | 3/1967 | Wells | 188/73.6 |
| 3,463,275 | 8/1969 | Soltis, Jr. | 188/73.6 |

FOREIGN PATENTS

| | | | |
|---|---|---|---|
| 1,353,793 | 1/1964 | Great Britain | 188/73.6 |

*Primary Examiner*—George E. A. Halvosa
*Attorney*—Marechal, Biebel, French & Bugg

ABSTRACT: A disk brake of the floating caliper type employs two friction pads and backing plates at each side of the caliper with a central abutment between each axial pair of plates for receiving and/or transmitting the braking torque of such plates. The split or dual plate construction permits the use of interchangeable brake plates and allows a wider arc of brake engagement while retaining the advantages of relatively arcuately short individual backing plates.

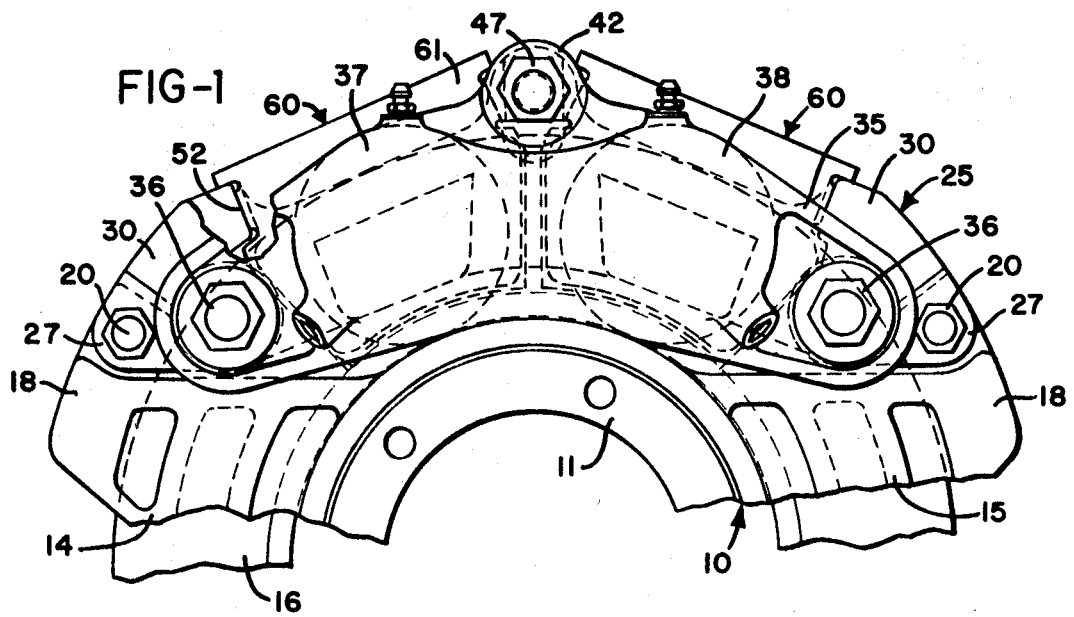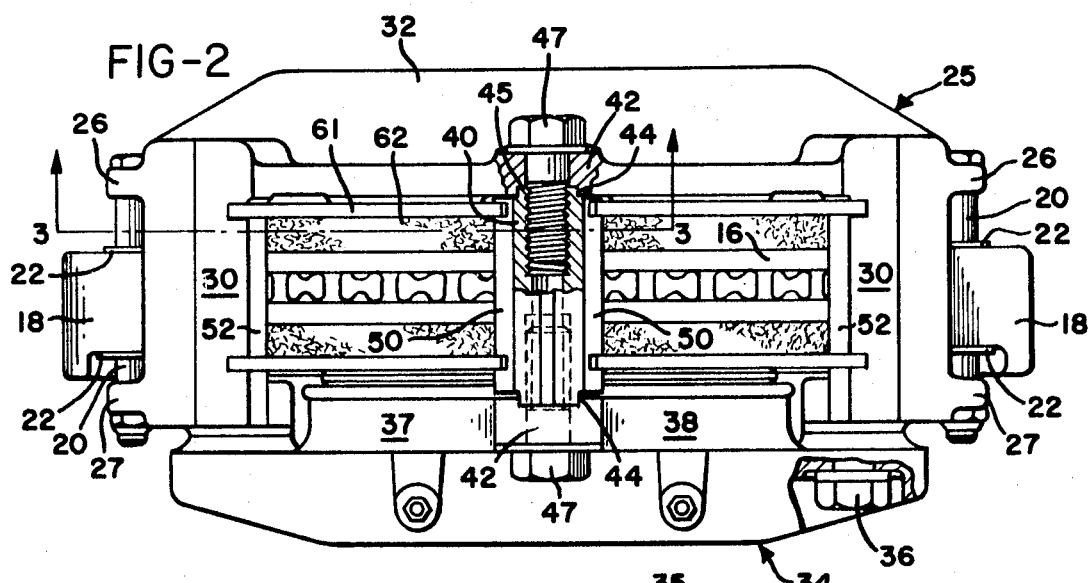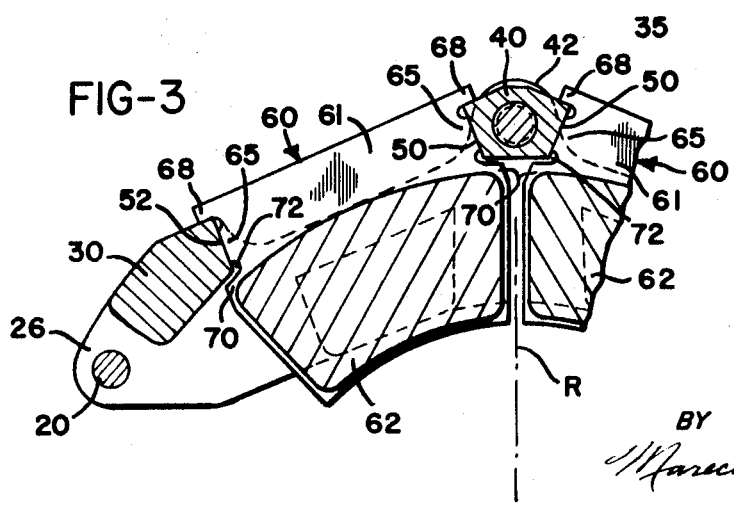

PATENTED AUG 31 1971
3,602,328
SHEET 2 OF 2
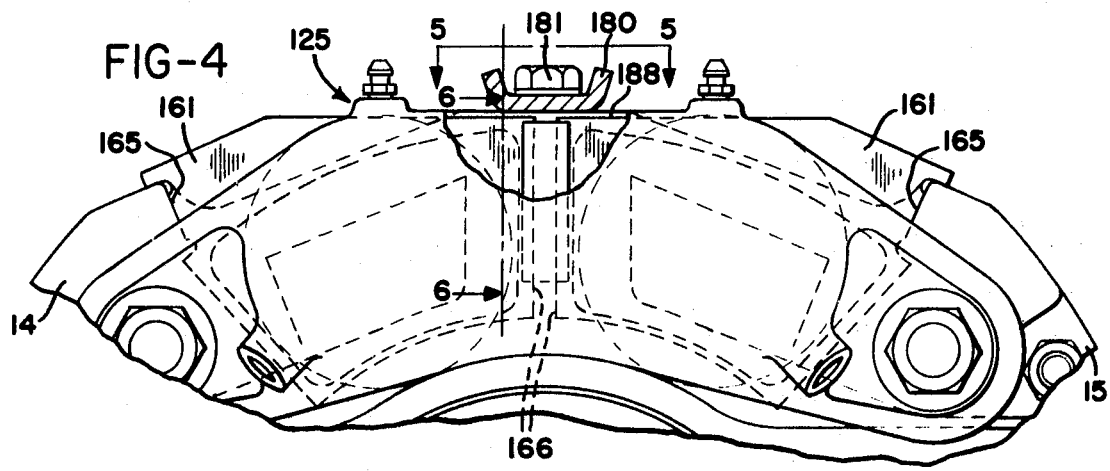
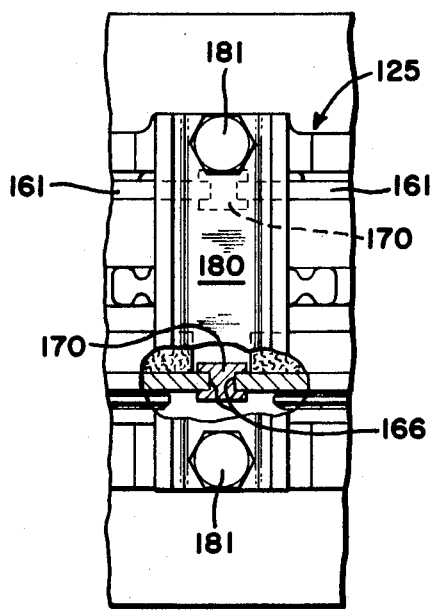
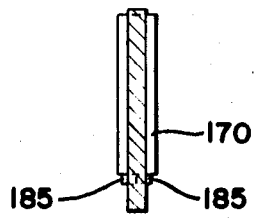

CALIPER TYPE DISC BRAKE WITH REMARKABLE FRICTION PADS

RELATED APPLICATION

This application is a continuation in part of application Ser. No. 770,196, filed Oct. 24, 1968, now abandoned.

BACKGROUND OF THE INVENTION

The present invention relates to caliper type disk brakes in which friction pads are moved generally axially against the surface of a disk for stopping the rotational movement of the disk. In heavy vehicles, or under conditions where high stopping loads are imposed, it is often desirable to engage a greater arcuate surface of the disk than in ordinary disk brakes, to reduce braking forces and the localized heating which often occurs in spot type brakes, and to improve the wearing qualities of the friction pads. Frequently, such larger or heavier duty brakes employ two or more separate piston units on one or on both sides of the caliper, in order to apply the necessary braking forces to the friction material.

The employment in caliper type brakes, of brake pads and associated backing plates of greater arcuate length, to distribute the wear and the work over a greater portion of the disk, results in relatively long plates in an arcuate sense. Such backing plates are subject to severe loading conditions due both to the axial forces applied to the piston units and to the column loading which is applied to the plate by reason of the braking torque. Usually, the torque is taken, during actual braking, at one end of the plate which may be positioned for sliding engagement with a suitable abutment, such as a pin or a flat surface. The column loading combined with the piston loading tends to cause buckling of the braking plates, resulting in a loss of waste of piston displacement and uneven wear on the attached lining. Additionally, arcuately long backing plates require suitable clearance at the ends due both to the need for accommodating manufacturing tolerances as well as the need for permitting a certain degree of expansion due to heat. Accordingly, a clearance space must be left which frequently results in a noisy or rattling brake when the brake is not actually being used.

SUMMARY OF THE INVENTION

The brakes of the present invention substantially eliminates the above difficulties while permitting a wide arcuate extent of the disk to be employed, by the use of a plurality of separate backing plates and attached pads, in a housing in which there is provided means for taking the torque substantially midway between the arcuate ends of the housing. In one embodiment this forms an abutment for one opposite pair of such plates in any one direction of rotation. In another embodiment an abutment means is interposed between arcuately adjacent plates to transfer the braking torque therebetween while providing for relatively independent axial movement of adjacent pads. The concept may be used in either fixed or floating caliper type brakes, and for any given side of the disk there is preferably one plate and pad combination for each piston unit. In this manner, a backing plate may be provided which occupies only a portion of the total arcuate extent of the caliper housing. Each backing plate thus has less column loading when transferring torque, and there is less tendency for buckling. Also, there is less overall expansion due to heat and thus wide clearances need not be employed.

The apparatus of this invention has the further advantage in that the separate backing plates and associated pads may be symmetrical and fully interchangeable without the necessity of observing any particular placement or position in replacing the pads. Further, the overall life of the lining is increased, since if a pad should wear unevenly, such uneven wear does not adversely affect the wearing or the braking efficiency of the remaining pads and plates.

The arrangement of this invention has the further advantage of improved load distribution over brakes in which single plates and pads are positioned on either side of the disk. Thus, in one preferred embodiment, braking torque is taken at two arcuately spaced locations on the housing when braking in any one direction, and each separate pad and plate on each side of the disk is only required to carry half the torque and absorb half the heating as would be required where unitary or single pads and plates are employed.

It is accordingly an important object of this invention to provide an improved caliper type disk brake in which at least two backing plates and associated pads are positioned on one side of the disk, with torque means for separately engaging the backing plates and receiving the braking torque therefrom.

Another object of this invention is to provide an improved caliper type disk brake in which a pair of side-by-side backing plates and associated friction pads are positioned on each side of the disk forming opposed pairs of pads with separate torque means for separately engaging each opposite pair of backing plates.

A further object of the invention is the provision of a caliper type brake in which the brake employs multiple piston units and in which there is a separate backing plate and associated friction pad on each side of the disk for each of the piston units.

A still further object of the invention is the provision of a caliper type disk brake in which a plurality of interchangeable pads and plates are employed on either side of the disk and in which the caliper housing is provided with an abutment arcuately midway between its ends for receiving the torque from one opposed pair of such plates.

These and other objects and advantages of the present invention will become apparent from the following description, the accompanying drawings and the appended claims.

BRIEF DESCRIPTION OF THE DRAWINGS

FIG. 1 is an end elevational view of a caliper type disk brake constructed according to this invention;

FIG. 2 is a plan view of the brake of FIG. 1 with a portion being broken away;

FIG. 3 is a vertical fragmentary section through the caliper housing showing the mounting and support arrangement for the pads and plates, taken generally along the line 3—3 of FIG. 2;

FIG. 4 is a fragmentary end elevation of a modified form of the invention;

FIG. 5 is a fragmentary plan view, partially broken away, looking generally along the line 5—5 of FIG. 4; and FIG. 6 is a fragmentary section taken along the line 6—6 of FIG. 4.

DESCRIPTION OF PREFERRED EMBODIMENTS

Referring to the drawings which illustrate preferred embodiments of the invention, a support or torque member 10 includes an inner annular mounting flange 11 by which it may be mounted on a fixed axle, and a pair of generally radially outwardly extending arms 14 and 15. The arms, as shown in FIG. 1, encompass a relatively wide segment of the disk 16. The arms 14 and 15 are terminated in outer ends 18 which are somewhat axially offset from the arms themselves and are thus positioned generally in overlying relation to the periphery of the disk 16. The arm ends 18 extend arcuately inwardly a short distance and are provided with an axial opening for receiving a caliper housing mounting pin 20 therethrough. For this purpose, the ends 18 may be provided with pairs of elastomeric bushings 22 which grip the outer surfaces of the mounting pins 20 in the manner shown and described in the U.S. Pat. of Walther 3,482,665 and assigned to the same assignee as this invention.

A floating type caliper is shown generally at 25 in FIGS. 1 and 2 and has spaced ears 26 and 27 formed at each opposite end for supporting one of the pins 20. In this manner the caliper 25 is mounted on the arms 14 and 15 for generally axial selftaligning movement with respect to the disk 16. The caliper 25 is formed with an open top, and has a pair of arcuately spaced webs or knuckles 30 which connect a reaction portion 32 on one side of the disk with a pressure portion 34 on the other side. The pressure portion 34 comprises a subassembly 35 which is bolted by bolts 36 extending into the knuckles 30, and contains a pair of side-by-side hydraulic piston units identified at 37 and 38 in FIGS. 1 and 2.

In respect to the general configuration of the caliper 25, the employment of spaced knuckles 30 and the pressure and reaction portion 32 and 34 which extend chordwise of the disk, the caliper housing is similar to that shown and claimed in the U.S. Pat. of Walther et al. 3,384,203 of 1968. However, the invention disclosed herein may be employed with advantage in opposed piston units in which the caliper is fixed, as well as in floating caliper brakes of the type disclosed in the above-identified Walther patent.

A torque bar 40 is mounted on the caliper 25 at a position which is arcuately midway between the knuckles 30. The bar 40 is supported radially outwardly of the periphery of the disk 16 on a pair of bosses 42, one each formed on each of the caliper portions 32 and 34. The bar 40 is formed with keys 44 at its opposite ends which are vertically slidably received in corresponding keyways 45 formed in the bosses 42. For the purpose of removably retaining the torque bar 40 axially between the bosses 42, a pair of bolts 47 may be employed through the bosses 42 and threaded into the interior of the bar 40 as shown in FIG. 2.

The torque bar 40 is generally hexagonal in cross section, as shown in FIG. 3, and defines arcuately opposite plate-engaging and torque receiving surfaces 50. The surfaces 50 are inclined to a radius R passing through the center of the torque bar 40 by an angle which equal approximately one-half of the total included angle between the bar and one of the knuckles 30. Also, each surface 50 is generally parallel to a corresponding torque receiving abutment surface 52 formed on the adjacent knuckles 30.

The brake of this invention includes a plurality of hydraulic backing plate and pad assemblies 60 which comprise a sheet metal backing plate 61 and a pad 62 of friction material riveted or bonded to one face of the plate 61. Preferably, there are as many of the backing plate assemblies 60 as there are piston units, and preferably the assemblies 60 are positioned in axially opposed pairs. As shown in FIG. 2, two of such opposed pairs of backing plates and pads are provided, one for each of the piston units 37 and 38.

The backing plates 61 and the associated pads 62 are accordingly positioned, on each side of the disk 16, in arcuately side-by-side relationship. Each of the plates 61 has a portion which extends radially into the open space between the torque bar 40 and the adjacent knuckle 30. The upper portions of the plates 61 are formed with an opposite pair of torque transmitting abutments 65. The abutments 65 have planar surfaces formed generally parallel to each other and generally parallel to a radius extending from the center of the disk centrally through the pad and backing plate assembly 60. The outer surfaces of the abutment 65 are proportioned to engage respectively one of the caliper abutment surfaces 50 and 52, while permitting axially sliding and aligning movement of the plates and pads. Further, the upper portion of the plate 61 is formed, at each of its arcuate ends, with overhanging lips 68 which are proportioned to overlie an adjacent portion of either a knuckle 30 or the torque bar 40, and support the plates 61 while preventing any tendency for rotational movement of these plates during the application of braking torque. In addition, each end of the plates 61 are formed with an overlying ledge 70 which extends arcuately, but in slightly spaced relation, to one of the knuckles 30 or to the torque bar 40. The space 72, which is thus defined between the ledge 70 and the associated knuckle or bar, provides clearance for the removal of the plates with radially outward removal of the torque bar 40 in the keyways 45.

Each of the plate and pad assemblies 60 are identical in construction, and each is interchangeable with another without regard to position. The abutment portions 65 are at the same angle at each arcuate end, and engage torque abutment surfaces at the same angle. The angle formed at such abutment surfaces to a radius passing through the center of the pad is approximately one-half the arcuate extent of the pad. For example, if each of the pads 62 occupy an included angle of approximately 45° with respect to the disk, then the parallel abutment surfaces 52 and 50 would have an angle of approximately 22½° to the radius R extending through the center of the torque bars 40. This arrangement has been found to be one which transmits the maximum torque from the plates to the torque bar and knuckles with the least amount of rotative coupling between the parts, and one which permits full interchangeability of the plates and associated pads.

In use, when hydraulic pressure is applied simultaneously to the piston units 37 and 38, a force is applied directly to the one of the plates 61 and this plate moves its pad of friction material into engagement with the disk 16, irrespective of the alignment or degree of movement of the arcuately adjacent pad. The entire caliper housing, being mounted for axial movement on the ends 18 of the arms 14 thus applies, simultaneously, a reaction force to the opposite ones of each of the pairs of pads and plates, and again, these plates are independent of each other and are moved into engagement with the opposite side of the disk. The braking torque is divided, and half of the torque is applied directly to one of the knuckles 30 by engagement of the plate abutments 65 with the surfaces 52, and the other half of the torque is applied to the torque bar 40 by engagement of the abutments 65 with the torque bar surfaces 50. Accordingly, with a given caliper brake covering a given arcuate segment of the disk, the torque is substantially equally divided in an arcuate sense, and each of the backing plates 61 carries approximately one-half of the torque which would be required to be carried if single backing plates were used to cover the same arcuate extent. Therefore, there is less column loading in the plates and less tendency for buckling and uneven wear. Further, each plate 61 carries the loading of only one of the piston units, which is preferably substantially centrally applied, and any uneven wearing tendencies which may occur in one of the plates will not adversely affect the operation of the remaining plates, and accordingly the overall braking efficiency remains relatively high.

The plates are quite simply removed merely by withdrawing the bolts 47 and sliding the bar 40 radially outwardly in its keyways 45. The plates 61 will be subject to some rotational movement during the extraction, as provided for by the clearance spaces 72. The plates may then be lifted out through the open top and readily replaced.

In the embodiment described in FIGS. 1–3, the individual plates 61 are positioned between means defining pairs of torque receiving portions of the caliper. The individual plates 61, forming an arcuate side-by-side pair of plates are thus fully independent of each other in the sense that they are acted upon by separate pistons, and the torque is separately taken from each plate by either the abutments 52 or 50 on the caliper housing. However, in some instances, it may be preferred to link or otherwise connect the arcuately adjacent pairs of plates for the purpose of torque-transmission while still remaining most of the advantages of the arcuately "split" plate construction of the embodiment of FIGS. 1–3.

Such a construction is shown in FIGS. 4–6 in which the caliper 125 is mounted on the torque arms 14–15 in the identical manner as that of the caliper 25. However, in the caliper 125 there is no provision for receiving the torque arcuately centrally of the plates as provided by the torque bar 40 of the previous embodiment. The backing plates 161 of this embodiment are formed somewhat differently from the backing plates 61 in that they are asymmetrically shaped by the elimination of the inwardly facing abutments 65 and the associated lips 68. However, in the arcuately remote ends the plates 161 are formed similarly to the plates 61 and thus include the torque transmitting abutments 165, corresponding in function to abutments 65 of the previous embodiments.

The plates 161 are further formed with arcuately adjacent and parallel spaced apart vertical edges 166. These edges are coupled for the purpose of torque transmission by a double-channel shaped key 170. The key 170 is thus formed with a pair of oppositely opening recesses which receive the respective edges 166, and is inserted radially between the adjacent plates, such as shown in FIGS. 4 and 5. The key 170 forms a loosely fitting coupling for the purpose of transmitting torque from one plate to the other while providing for and permitting individual transverse movement of the respective plates and friction pads, as actuated by the respective piston units 37 and 38. In some instances, it may be satisfactory to permit the adjacent edges 166 to abut against each other, thus eliminating the necessity for the key 170. However, the employment of a key for an intermediate abutment is preferred as providing a more positive means by which torque may be transmitted between the adjacent plates.

Means for retaining the braking plates and key 170 in place comprises a retainer plate 180 which extends axially between the caliper pressure and reaction portions, and retained in place by a pair of bolts 181. The plate 180 also serves to add central reinforcing strength to the caliper. The bottom surface of the plate 180 is arcuately positioned in overlying relation to the adjacent upper edges 188 of the plates 161, to prevent the lifting or rotation of the plates 161 during braking.

The adjacent edges 166 of the plates 161 may be notched to form axially offset portions, as shown at 185 in FIG. 6. The portions 185 form abutments to limit the inward movement of the key 170.

The operation of the embodiment of FIGS. 4–6 is substantially the same as described above with the exception that, with any given direction of rotation the braking torque from one of the backing plates 161 is transmitted through the key 170 to the arcuately adjacent plate. The advantage of individual backing plates acted upon by individual hydraulic cylinders is retained, thereby permitting the useful employment, in a caliper type disk brake, of a relatively wide arcuate segment of the disk. The changing of the plates and friction pads is readily accomplished by the removal of the retainer 180 and the radial withdrawal of the old plates and the insertion of new plates. The key 170 may be conveniently slid into place after the plates 161 are in approximate position.

While the forms of apparatus herein described constitutes preferred embodiments of the invention, it is to be understood that the invention is not limited to these precise forms of apparatus, and that changes may be made therein without departing from the scope of the invention.

What is claimed is:

1. A caliper type disk brake comprising a rotatable disk, a caliper extending arcuately over a peripheral portion of said disk and having a pressure portion positioned chordwise adjacent one side of said disk and a reaction portion positioned chordwise adjacent the opposite side of said disk, said caliper portions being joined together by a pair of arcuately spaced knuckles which extend axially of said disk outwardly of the periphery thereof, a torque bar positioned substantially midway arcuately between said knuckles and extending axially between said caliper portions outwardly of said disk periphery, said pressure portion having a pair of side-by-side piston units adapted to apply a braking force, a plurality of backing plate and pad combinations positioned between said portions and said disk with two each of said combinations being received in side-by-side relation between each of said portions and said disk, and each of said backing plates having abutment means which extend radially outwardly of the disk periphery slidably engaging one of said knuckles and said torque bar for transferring braking torque therethrough, said torque bar being removable to permit withdrawal and insertion of said backing plate combinations through the space between said knuckles.

2. In a caliper type disk brake including a rotatable disk and a caliper extending along an arcuate extent of said disk and having portions positioned on opposite sides of said disk, and a pair of piston units in at least one of said caliper portions positioned in side-by-side relationship, the improvement in friction pads and support means therefor comprising at least one pair of backing plates, each plate having a separate friction pad secured thereon, said plates and the associated pads being positioned in side-by-side relation corresponding to that of said piston units between said piston units and said disk so that one each of said pads is axially opposite of one of said piston units, said backing plates each having back portions which extend radially outwardly of the periphery of the said disk with each of said back portions being formed with abutment means on the arcuate ends thereof, and means on said caliper defining three arcuately spaced abutments positioned outwardly of the disk periphery including two spaced apart end abutments and a center abutment for receiving torque from the arcuate ends of said plates permitting each of said plates to move independently of the other under the influence of its associated said piston unit, said center abutment being removable from said caliper to facilitate insertion and withdrawal of said backing plates through the space between said end abutments.

4898-A

PO-1050
(5/69)

UNITED STATES PATENT OFFICE
CERTIFICATE OF CORRECTION

Patent No. 3,602,328            Dated August 31, 1971

Inventor(s) Chester N. Fannin & Carlos P. Afanador

It is certified that error appears in the above-identified patent and that said Letters Patent are hereby corrected as shown below:

The title of the invention as listed on the issued patent is:

"Caliper Type Disc Brake with Remarkable Friction Pads"

the correct title should be:

Caliper Type Disc Brake with REMOVABLE Friction Pads

Signed and sealed this 21st day of March 1972.

(SEAL)
Attest:

EDWARD M. FLETCHER, JR.
Attesting Officer

ROBERT GOTTSCHALK
Commissioner of Patents